(12) United States Patent
Kim et al.

(10) Patent No.: US 6,307,665 B1
(45) Date of Patent: *Oct. 23, 2001

(54) ACOUSTO-OPTIC MODULATOR

(75) Inventors: Yong-hoon Kim, Sungnam; Hang-woo Lee, Suwon, both of (KR)

(73) Assignee: Samsung Electronics Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 09/273,758

(22) Filed: Mar. 22, 1999

Related U.S. Application Data

(63) Continuation of application No. 08/911,700, filed on Aug. 15, 1997, now Pat. No. 5,900,966.

(30) Foreign Application Priority Data

Oct. 28, 1996 (KR) .................................................. 96-49310

(51) Int. Cl.[7] ....................................................... G02F 1/33
(52) U.S. Cl. ........................ 359/311; 359/286; 359/287; 359/305; 359/285
(58) Field of Search .................................. 359/285–287, 359/305, 311

(56) References Cited

U.S. PATENT DOCUMENTS

| | | | | |
|---|---|---|---|---|
| 3,771,856 | * | 11/1973 | Eschler ................................ | 359/305 |
| 3,798,746 | * | 3/1974 | Alphonse et al. .................... | 228/116 |
| 4,146,955 | * | 4/1979 | Young, Jr. et al. .................. | 359/311 |
| 4,265,517 | * | 5/1981 | Blair et al. ........................... | 359/305 |
| 4,577,933 | * | 3/1986 | Yip et al. ............................. | 359/305 |
| 4,771,629 | * | 9/1988 | Carlson et al. ...................... | 73/23.35 |
| 5,102,213 | | 4/1992 | Lee et al. ............................. | 359/890 |
| 5,521,759 | | 5/1996 | Dobrowolski et al. .............. | 359/585 |
| 5,900,966 | | 5/1999 | Kim et al. ............................ | 359/311 |

* cited by examiner

*Primary Examiner*—Evelyn A Lester
(74) *Attorney, Agent, or Firm*—Burns, Doane, Swecker & Mathis, L.L.P.

(57) ABSTRACT

An acousto-optic modulator including an ultrasonic medium for controlling light from an optical source through diffraction, two transducers each having one electrode formed on one side thereof, the electrodes being for generating an acousto-elastic wave, and a conductive adhesive layer interposed between the ultrasonic medium and each of the sides of the transducers opposite to the sides on which the electrodes are installed, in order to adhere each of the transducers to the ultrasonic medium.

15 Claims, 3 Drawing Sheets

ACOUSTO-OPTIC MODULATOR

This application is continuation of U.S. application, Ser. No. 08/911,700, filed on Aug. 15, 1997, now U.S. Pat. No. 5,900,966.

BACKGROUND OF THE INVENTION

1. Field of the Invention

The present invention relates to an acousto-optic modulator, and more particularly, to an acousto-optic modulator equipped with a transducer having a structure in which impedance matching is easy.

2. Description of the Related Art

With a recent increase in the demand for multimedia, various large screen display devices appeared in order to overcome the defects of an existing cathode ray tube (CRT) and cope with the multimedia. However, existing image display means such as the CRT or a liquid crystal display (LCD) are difficult to manufacture, and their resolution is degraded, as they become larger. Thus, there is a limit in the use of the CRT and LCD. A projector is an image display device capable of projecting a picture onto a large screen using the CRT or LCD. However, the projector also has many problems and technical limitations.

Another image display device for a large screen is a laser projector for directly projecting laser light having picture information onto a screen. The laser projector can realize a large screen, has both high contrast and optical efficiency, has no distortion or color errors, has both a luminance and contrast independent of distance, and is applied to large screen HDTV (high definition television). Generally, the laser projector uses a xenon (Xe) lamp, helium-neon (He—Ne) laser, and argon (Ar) laser as an optical source. However, krypton-argon (Kr—Ar) laser has received much attention for simplification of the system.

In general, a color display system is comprised of an optical generation unit, an optical modulation unit, an image signal generation unit, a scanning unit, and a screen unit. A predetermined beam is generated by the optical generation unit, and is incident upon the optical modulation unit. The optical modulation unit modulates the incident beam according to an image signal provided from the image signal generation unit. Here, the modulated beam has pixel-unit information. The scanning unit sequentially and continuously scans the screen unit with the modulated beam, such that an image is displayed on the screen unit.

An acousto-optic modulator (AOM), an electrooptic modulator (EOM), or an acousto-optic tunable filter (AOTF) is included as an optical modulator in the optical modulation units currently in use to make laser beam spots scan the screen unit. Among them, the AOM is the most frequently used at present, and has a simple driving circuit. A typical optical modulation system uses three AOMs. In a laser projection display system, a high-output laser beam is used as an optical source to form a high definition image on a large screen, and an AOM used in this laser projection display system must have a structure which can sufficiently resist high output.

FIG. 1 is a perspective view showing the structure of a conventional AOM.

Referring to FIG. 1, in the conventional AOM, a transducer 12 for generating acousto-elastic waves by an electrode 14 is provided on one side of an ultrasonic medium 10. The transducer 12 is coupled to the ultrasonic medium 10 by an adhesive layer 13 including a silver (Ag) layer, and the electrode 14 made of gold (Au) is installed on the upper surface of the transducer 12. Accordingly, a structure is formed in which the transducer 12 is interposed between the electrode 14 and the adhesive layer 13, and this structure acts as a capacitor.

An acousto-elastic wave absorbing element (not shown) for preventing reflection of ultrasonic waves is installed on the side of the medium opposite to the transducer 12. The ultrasonic medium 10 is made of a material selected from the group consisting of fused quartz, $PbMoO_4$, $TeO_2$, Te glass, and Schwer-Flint glass ($SF_4$). A crystal material, $PbMoO_4$ or $TeO_2$, is suitable for relatively high frequencies, and a glass material is used mainly for low frequencies since it is cheap, but has a large propagation loss at a high frequency. A light incident/emitting surface 10A or 10B passing laser light is optically polished An antireflection layer is generally deposited on the light incident/emitting surface 10A or 10B since on account of a high refractive index of the ultrasonic medium 10 there is a large reflection loss when laser light enters or is emitted.

FIG. 2 is a top view of the electrode 14 installed on the transducer 12 of the conventional AOM.

Referring to FIG. 2, a single electrode is used as the electrode 14 in the conventional AOM. When the length (l) of the electrode is 10 mm and the mean height ((h1+h2)/2) thereof is 0.55 mm, the area (A) of the electrode is 5.5 $mm^2$.

Meanwhile, impedance matching must be performed to use the AOM together with a driving circuit. The impedance matching has the following objectives: (1) to compensate for frequency mismatching of transducer due to the thickness error so as to resonate with the frequency of a driving circuit; and (2) to effectively transmit RF power by performing impedance matching between the driving circuit and the transducer.

When an impedance Rs of 50 Ω is required by a 150 MHz AOM, the desired impedance cannot be obtained with one transducer employed as in the conventional AOM.

To be more specific, the relationship between the impedance (Rs and a capacitance ($C_0$) in the structure of the AOM can be generally expressed by the following Equation 1:

$$Rs = \frac{1}{\omega_o C_o} \quad (1)$$

wherein $\omega_0$ indicates angular frequency and is equal to $2\pi f_0$ (where, $f_0$ is 1.1 λ s; fs indicates a center frequency and is equal to 150 MHz in the case of the 150 MHz AOM.

Also, the capacitance ($C_0$) and the area (A) of the electrode have a relationship expressed by the following Equation 2:

$$C_0 = \frac{\varepsilon_0 \varepsilon_\gamma A}{l} \quad (2)$$

wherein $\in_0$ indicates a dielectric constant in a vacuum and is equal to 8.8542 $\lambda.0^{-12}$F/m, $\in_\gamma$ indicates relative permittivity and is equal to 38.6 in the case of a transducer made of an $LiNbO_3$ (hereinafter, abbreviated to LN) single crystal of 36° Y cut, and l indicates the distance between electrodes, i.e., the thickness of the dielectric, and is expressed by $V/2f_0$. Here, V indicates an acoustic speed in the LN single crystal and is equal to 7300 m/s in case of the transducer made of an LN single crystal of 36° Y cut.

The area of an electrode to render an impedance of 50Ω can be obtained with respect to the given length of an electrode by Equations 1 and 2. Alternatively, the impedance can also be calculated from the area of the electrode.

The impedance in the conventional AOM having such an electrode structure as shown in FIG. 2 is calculated to be 11.30Ω by applying the above-described relationship.

As described above, there is a difference between the desired impedence of 50Ω and an impedance value obtained when one transducer is employed as in the conventional AOM. The difference therebetween serves as a significant disadvantage in impedance matching between an AOM and a driving circuit, so that RF power cannot be effectively transmitted.

SUMMARY OF THE INVENTION

To solve the above problem, it is an objective of the present invention to provide an acousto-optic modulator (AOM) for use in a laser projection display (LPD) system, which can be easily impedance-matched with a driving circuit.

Accordingly, to achieve the above objective, there is provided an acousto-optic modulator comprising: an ultrasonic medium for controlling light from an optical source through diffraction; two transducers each having one electrode formed on one side thereof, the electrodes being for generating an acousto-elastic wave; and a conductive adhesive layer interposed between the ultrasonic medium and each of the sides of the transducers opposite to the sides on which the electrodes are installed, in order to adhere each of the transducers to the ultrasonic medium.

The ultrasonic medium is formed of a $TeO_2$ single crystal, each of the transducers is formed of $LiNbO_3$ single crystal, and the electrode is formed of gold (Au).

Preferably, the two transducers have opposite polarization directions.

The area of each of the electrodes is between 2.4 mm$^2$ and 2.8 mm$^2$ when an impedance of 50Ω is required.

According to the present invention, an AOM capable of being easily impedance-matched with a driving circuit can be realized.

BRIEF DESCRIPTION OF THE DRAWINGS

The above objective and advantage of the present invention will become more apparent by describing in detail a preferred embodiment thereof with reference to the attached drawings in which.

DESCRIPTION OF THE PREFERRED EMBODIMENT

Figure 1:
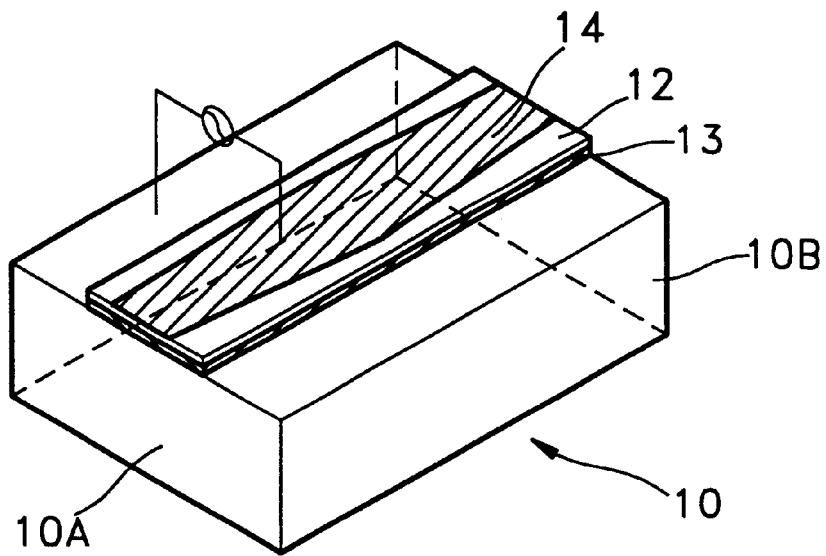
FIG. 1 is a perspective view illustrating the structure of a conventional acousto-optic modulator (AOM)
Figure 2:
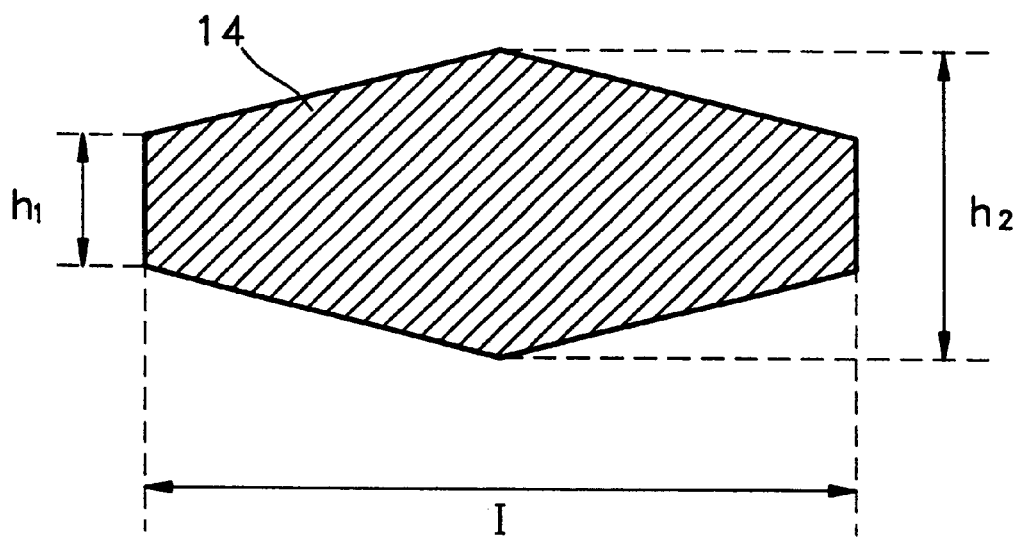
FIG. 2 is a top view of an electrode formed on a transducer in the conventional AOM.
Figure 3:
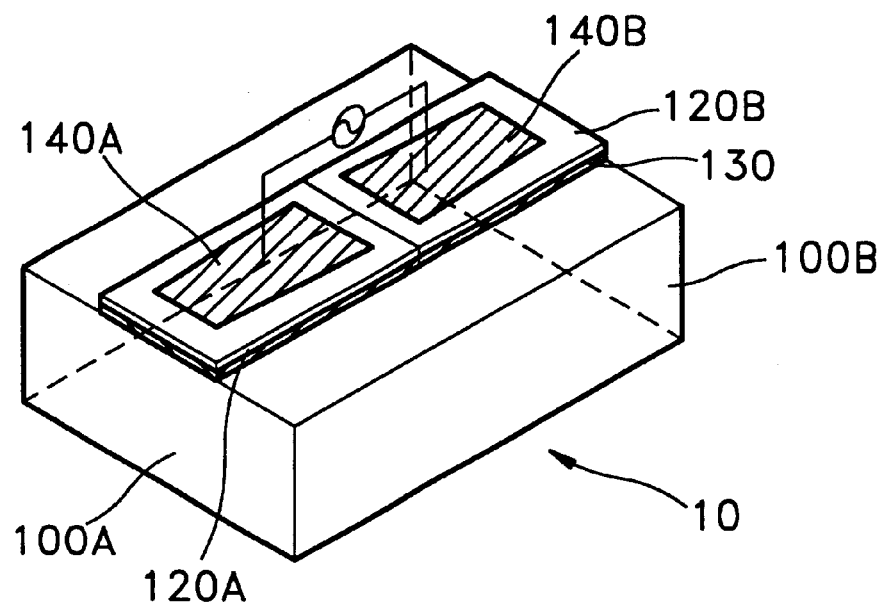
FIG. 3 is a perspective view illustrating the structure of an AOM according to a preferred embodiment of the present invention.

Referring to FIG. 3, an acousto-optical modulator (AOM) according to the present invention includes an ultrasonic medium 100 for controlling light, e.g., laser light, from an optical source through diffraction, and two transducers 120A and 120B which are provided on one side of the ultrasonic medium 100 and have electrodes 140A and 140B each for generating acousto-elastic waves. That is, the transducers 120A and 120B respectively have a single electrode 140A and a single electrode 140B each made of gold (Au). Accordingly, the AOM according to the present invention has two electrodes 140A and 140B. The transducers 120A and 1208 are coupled to the ultrasonic medium 100 by a conductive adhesive layer, e.g., an adhesive layer 130 including a silver (Ag) layer. As a consequence, the transducers 120A and 120B are interposed respectively between each of the electrodes 140A and 140B and the adhesive layer 130. This structure serves as two capacitors connected in series.

Preferably, the ultrasonic medium 100 is formed of $TeO_2$ single crystal, and the transducers 120A and 120B are each formed of $LiNbO_3$ (LN) single crystal.

In order to manufacture the AOM according to the present invention having such a structure, the $TeO_2$ single crystal forming the ultrasonic medium 100 must be processed so that the surface of the ultrasonic medium, to which the transducers 120A and 120B are to be attached, can be in the [001] direction, so that light incident/emitting surfaces 100A and 100B passing light can be in the [010] or [110] direction. Also, the LN single crystal forming the transducers 120A and 120B is formed using a 36° Y cut. The transducers 120A and 120B are attached to the ultrasonic medium 100 by the adhesive layer 130 which includes a chromium (Cr) layer, a silver (Ag) layer, and an indium (In) layer.

Also, ultrasonic power must be increased to obtain high diffraction efficiency. Thus, the two transducers 120A and 120B are installed so that their polarization directions are opposite each other. When an RF signal is applied to the AOM according to the present invention configured as described above, electric fields applied respectively to the two transducers 120A and 120B provide 1800 different phases. At this time, maximum ultrasonic power can be obtained since the vibration direction of particles in a piezoelectric transducer medium is determined by the relative direction of the applied electric fields and the polarization direction of the piezoelectric material.

The transducers 120A and 120B attached to the ultrasonic medium 100 are accurately processed to have a thickness of about 22 μm, and the electrodes 140A and 140B are then formed of gold (Au).

Figure 4:
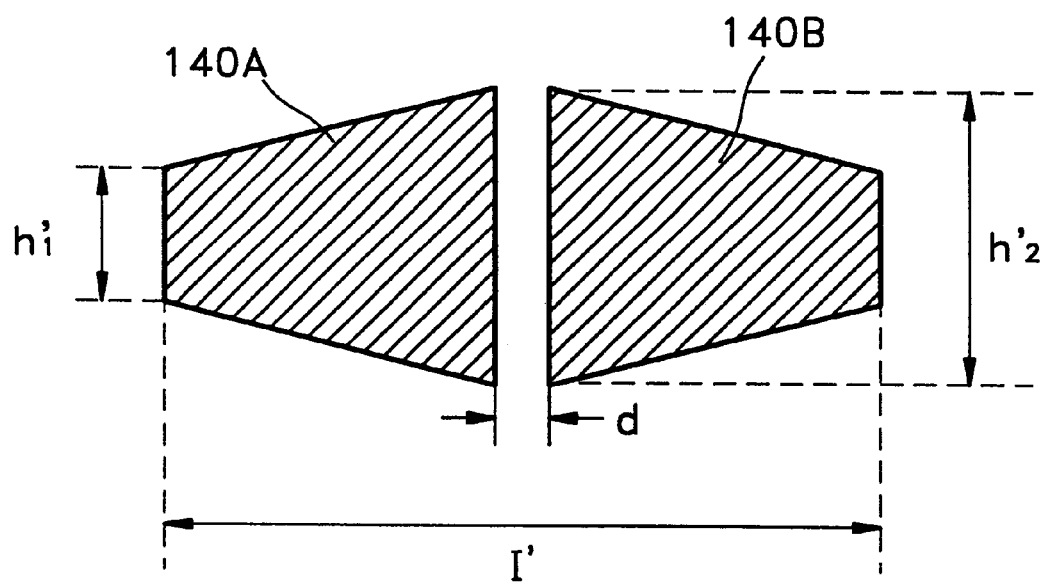
FIG. 4 is a top view of an electrode formed on the transducer of FIG. 3.

FIG. 4 is a top view of the electrodes 140A and 140B formed on the transducers 120A and 120B of the AOM of FIG. 3.

Referring to FIG. 4, in the AOM according to the present invention, the total length (l') from the far side of electrode 140A to the far side of electrode 140B can be 10 mm, the mean height $((h'_1 + h'_2)/2)$ can be 0.55 mm, and the gap (d) between the electrodes 140A and 140B can be 0.5 mm. Here, the area (A) of each of the electrodes 140A and 140B is 2.6125 mm$^2$.

Figure 5:
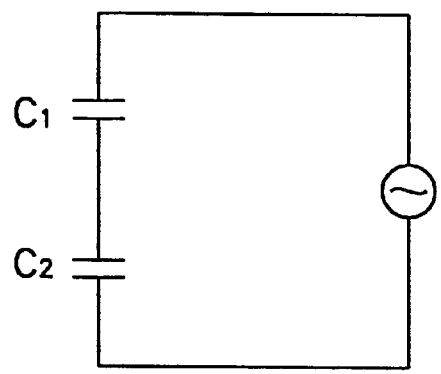
FIG. 5 is an equivalent circuit diagram of an AOM equipped with the electrode of FIG. 4.

FIG. 5 is an equivalent circuit diagram of an AOM equipped with the electrode designed as shown in FIG. 4.

Referring to FIG. 5, the capacitance $C_t$ of the electrodes shown in FIG. 4 can be expressed by the following Equation:

$$C_t = \frac{C_1 C_2}{C_1 + C_2}$$

Here, since $C_1$ is equal to $C_2$, $C_t$ is expressed by $C_1/2$.

Therefore, when the capacitances $C_1$ and $C_2$ of the electrodes 140A and 140B are calculated using Equation 2, each is 40.6 pF, and thus $C_t$ is 20.3 pF.

When the capacitance values obtained in the above are substituted into Equation 1, impedance (Rs) is 48Ω. This impedance value is very close to 50Ω which is required for impedance matching, and is thus significantly advantageous to the impedance matching between an AOM and a driving circuit.

The electrode of the AOM according to the present invention is not limited to the size shown in FIG. 4. Also, when impedance of 50Ω is required, it is preferable that the area of each of the electrodes is between 2.4 mm$^2$ and 2.8 mm$^2$.

Figure 6:
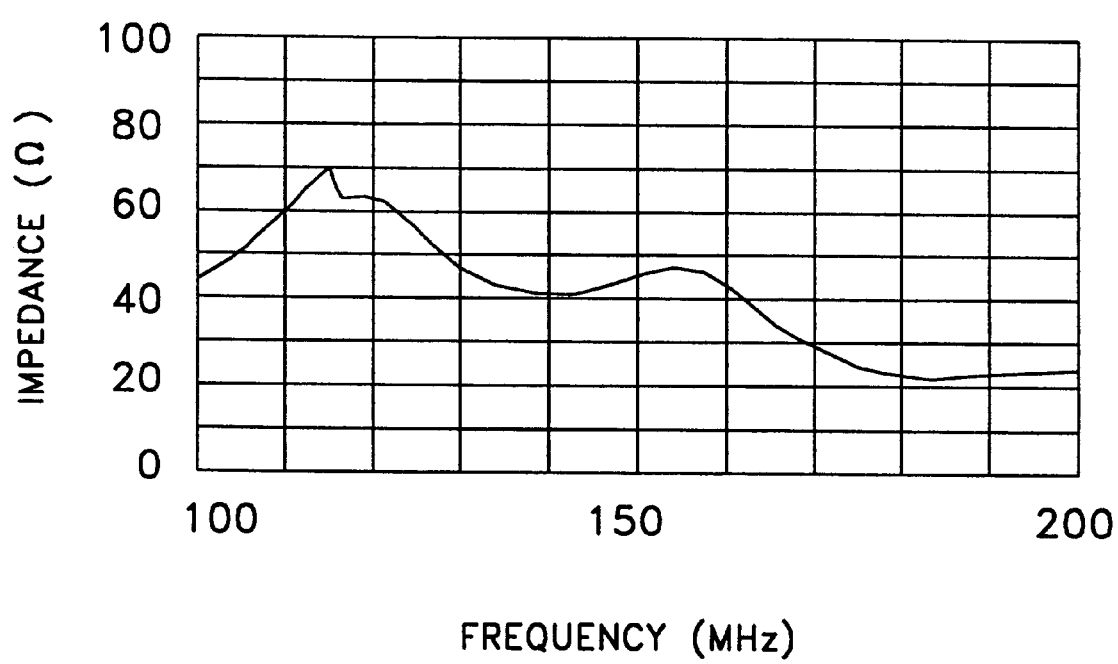
FIG. 6 is a graph showing a variation of impedance according to the frequency of a signal input from a driving circuit in the AOM according to a preferred embodiment of the present invention.

FIG. 6 is a graph showing variations in the impedance according to the frequency of a signal input from a driving circuit into the AOM according to a preferred embodiment of the present invention.

As can be seen in FIG. 6, the impedance of the AOM according to the present invention at a center frequency of 150 MHz measures close to an impedance of 50Ω which is desired.

As described above, the AOM according to a preferred embodiment of the present invention has two electrodes and two transducers, such that it is easily impedance-matched with a driving circuit. The two transducers are provided so as to have opposite polarization directions, such that maximum ultrasonic power can be obtained. Thus, efficiency of the acousto-optic modulator can be improved.

The present invention is described in detail by taking a preferred embodiment as an example, but it is not limited to the embodiment. Various modifications may be effected within the technical spirit of the present invention by those skilled in the art.

What is claimed is:

1. An acousto-optic modulator comprising:
   an ultrasonic medium for controlling light from an optical source through diffraction;
   two transducers each having one electrode formed on one side thereof, the electrodes being for generating an acousto-elastic wave; and
   a conductive adhesive layer interposed between the ultrasonic medium and each of the sides of the transducers opposite to the sides on which the electrodes are installed, in order to adhere each of the transducers to the ultrasonic medium.

2. The acousto-optic modulator as claimed in claim 1, wherein the ultrasonic medium is formed of a TeO$_2$ single crystal.

3. The acousto-optic modulator as claimed in claim 1, wherein each of the transducers is formed of LiNbO$_3$ single crystal, and the electrode is formed of gold (Au).

4. The acousto-optic modulator as claimed in claim 1, wherein the two transducers have opposite polarization directions.

5. The acousto-optic modulator as claimed in claim 1, wherein the area of each of the electrodes is between 2.4 mm$^2$ and 2.8 mm$^2$ when an impedance of 50Ω is required.

6. An acousto-optic modulator consisting essentially of:
   an ultrasonic medium for controlling light from an optical source through diffraction;
   two transducers each having one electrode formed on one side thereof, the electrodes being for generating an acousto-elastic wave; and
   a conductive adhesive layer interposed between the ultrasonic medium and each of the sides of the transducers opposite to the sides on which the electrodes are installed, in order to adhere each of the transducers to the ultrasonic medium.

7. The acousto-optic modulator as claimed in claim 6, wherein the ultrasonic medium is formed of a TeO$_2$ single crystal.

8. The acousto-optic modulator as claimed in claim 6, wherein each of the transducers is formed of LiNbO$_3$ single crystal, and the electrode is formed of gold (Au).

9. The acousto-optic modulator as claimed in claim 6, wherein the two transducers have opposite polarization directions.

10. The acousto-optic modulator as claimed in claim 6, wherein the area of each of the electrodes is between 2.4 mm$^2$ and 2.8 mm$^2$ when an impedance of 50Ω is required.

11. An acousto-optic modulator comprising:
    an ultrasonic medium for controlling light from an optical source through diffraction;
    two transducers each having only one electrode formed on one side thereof, the electrodes being for generating an acousto-elastic wave; and
    a conductive adhesive layer interposed between the ultrasonic medium and each of the sides of the transducers opposite to the sides on which the electrodes are installed, in order to adhere each of the transducers to the ultrasonic medium.

12. The acousto-optic modulator as claimed in claim 11, wherein the ultrasonic medium is formed of a TeO$_2$ single crystal.

13. The acousto-optic modulator as claimed in claim 11, wherein each of the transducers is formed of LiNbO$_3$ single crystal, and the electrode is formed of gold (Au).

14. The acousto-optic modulator as claimed in claim 11, wherein the two transducers have opposite polarization directions.

15. The acousto-optic modulator as claimed in claim 11, wherein the area of each of the electrodes is between 2.4mm$^2$ and 2.8mm$^2$ when an impedance of 50Ω is required.

* * * * *